(12) United States Patent
Meyer et al.

(10) Patent No.: US 6,321,254 B1
(45) Date of Patent: Nov. 20, 2001

(54) METHOD AND INTERFACE FOR A CENTRALIZED ARCHIVING AND DE-ARCHIVING SYSTEM

(76) Inventors: Ernst Woldemar Wolfgang Meyer, Belfortstrasse 9, Cologne (DE), 50668; Uwe Hans Mundry, 50 Rocky Creek Rd., Apt. 121, Greenville, SC (US) 29615

(*) Notice: Subject to any disclaimer, the term of this patent is extended or adjusted under 35 U.S.C. 154(b) by 0 days.

(21) Appl. No.: 09/202,861

(22) PCT Filed: May 15, 1997

(86) PCT No.: PCT/EP97/02492

§ 371 Date: Mar. 15, 1999

§ 102(e) Date: Mar. 15, 1999

(87) PCT Pub. No.: WO97/50048

PCT Pub. Date: Dec. 31, 1997

(30) Foreign Application Priority Data

Jun. 24, 1996 (DE) ............................. 196 25 196

(51) Int. Cl.[7] ........................................ G06F 13/00
(52) U.S. Cl. ................ 709/213; 709/215; 709/217; 709/225
(58) Field of Search ........................ 709/201, 203, 709/213, 215, 216, 217, 218, 219, 223, 225, 250, 321, 328; 707/104, 204, 10

(56) References Cited

U.S. PATENT DOCUMENTS

| | | | |
|---|---|---|---|
| 4,644,468 | * 2/1987 | Dostr et al. | 709/220 |
| 5,262,943 | * 11/1993 | Thibado et al. | 128/630 |
| 5,446,740 | * 8/1995 | Yien et al. | 709/247 |
| 5,550,976 | * 8/1996 | Henderson et al. | 709/201 |
| 5,649,196 | * 7/1997 | Woodhill et al. | 709/102 |
| 6,000,041 | * 12/1999 | Baker et al. | 714/39 |
| 6,026,392 | * 2/2000 | Kouchi et al. | 707/2 |

FOREIGN PATENT DOCUMENTS

| | | |
|---|---|---|
| 3418618 C2 | 8/1985 | (DE) . |
| 3823252 A1 | 1/1989 | (DE) . |
| 4427366 A1 | 2/1996 | (DE) . |
| 4436642 A1 | 4/1996 | (DE) . |
| 0671696 A1 | 9/1995 | (EP) . |

* cited by examiner

Primary Examiner—Viet D. Vu
(74) Attorney, Agent, or Firm—Frank H. Foster; Kremblas, Foster, Phillips & Pollick

(57) ABSTRACT

An arrangement for filing and retrieving data of a plurality of mutually remote data sources which are connected to a remote central file-storage system by a public, wide-area transmission network. Mutually separable storage fields are maintained in the central file-storage system by allocating separate storage fields to the data of each of the remote data sources by a user filter coupled to the file storage system to ensure that every user can transfer in the central file system only in his field. An access authorization code transmitted from a remote data source is compared to an access code stored in the file-storage system to permit access by a remote data source to the separate storage fields allocated to the data source seeking access.

12 Claims, 3 Drawing Sheets

METHOD AND INTERFACE FOR A CENTRALIZED ARCHIVING AND DE-ARCHIVING SYSTEM

BACKGROUND OF THE INVENTION

The invention relates to an arrangement for filing or retrieving data in at least one data source which can be coupled to at least one external file store via data transmission means. Furthermore, the invention relates to a system for storage relocation, filing and/or retrieving data which is suitable for use in the said arrangement and has at least one file store and data transmission means for coupling it to one or more data source and/or one or more local networks having at least one or more data sources. Furthermore the invention relates to an interface for such a filing system.

The increasing use of data processing in public and private sectors generates ever-increasing amounts of data which have to be kept or stored in the short, medium or long term. In particular, they have also to be kept ready for re-use. For this purpose, file solutions are known in which the computer systems of the user are connected via local networks to a user-specific file system, that is to say a file system installed locally at the user's premises (for example a private computer system). Off-line media, for example diskettes, CD ROMS, magnetic tapes, etc., which are written onto hardware installed at the user's premises and are connected via client-specific data interfaces (for example SCSI, in-house network) to the user's data processing system, are also widely used for filing. In the case of sensitive (for example, personal) data, it is additionally necessary to ensure that the data cannot be viewed, changed, removed or otherwise misused by unauthorized persons. If off-line media are used, this requires the use of rugged, sealable containers and, if a filing computer is used, a relatively expensive access protection.

A further problem is the investments in the hardware and software of a filing system which are necessary for filing the data.

SUMMARY OF THE INVENTION

The object of the invention is to provide, while avoiding the abovementioned disadvantages, a reliable and efficient, in particular, also an economically operable filing system which is designed for the (quasi)simultaneous processing of a multiplicity of filing tasks, in particular of different filing clients. To achieve this, the invention proposes, in the case of a filing arrangement of the type mentioned at the outset, that there is provided as data transmission means at least one trunk network or wide-area network and also interfaces which are connected thereto from different places and via which a multiplicity of spatially or geographically remote data sources and/or different local networks with one or more data sources can be coupled centrally to the file store or stores, and the file store has mutually separable storage fields which are allocated in each case to one of the spatially remote data sources or local networks. Suitable as a specific implementation of the interfaces for linking the data sources, local networks and/or the file store to the trunk network are, given a similar structure of the networks to be connected, so-called bridges or, if that is not the case, gateways.

The invention makes it possible to provide, for a multiplicity of external users, a centralized wide-area file which is based on an arrangement of data processing components (hardware and software) for filing and managing data generated on user-oriented computer systems. In this arrangement, the trunk or wide-area network (WAN) is linked in a novel manner with a file system. This makes it possible to file user-specific data externally in a file system which is foreign to the user. This makes it possible to keep (file) in the short, medium or long term data (for example, text documents, graphics, diagrams, personal data, design drawings, etc.) which have been generated by the user on user-oriented computer systems (typically a PC or workstation) using commercial or, alternatively specific software. According to the invention, said data can be transferred via the wide-area network, for example ISDN, the Internet or also in-house company networks. After transmission over the latter, the filing operation can be carried out by writing the relevant data onto off-line media not available at the user's premises but, on the contrary, installed at the premises of a remote file operator. Thus, the investments in a filing system (hardware and software) and also the logistic expenditure in maintenance of the file, including staff to manage off-line data carriers, which investments are necessary for filing the data, can be much more easily amortized.

To achieve the inventive object mentioned at the outset, in a filing system having the features mentioned at the outset, the invention proposes that the data transmission means have a plurality of interfaces which are each designed for connection to a trunk network or wide-area network and which serve to link the one or more data sources and also the file store to the wide-area network, and the addressing of the file store is linked to a user filter which is designed to separate and/or keep apart data of different data sources in the file store.

Thereafter, a file user can be linked via a user-side installed interface, for example a gateway, which is a component of the centralized trunk file system. Via a novel bus system in the filing, the file component is connected to a wide-area network which is implemented as a leased line or a switched-line connection in a suitable public trunk network and a file-side interface, for example a gateway. This linking according to the invention of the user-oriented computer systems to the file component or the file store with upstream wide-area interface makes possible the transmission of data over virtually any desired spatial distances ("wide-area traffic") between the user computer and the file. Owing to the use according to the invention of the wide-area network, in particular, as a bus, data can be filed by virtually any number of users who are no longer disposed, as in the state of the art, locally with respect to the file component or the file store, but are now externally disposed (multiple external usage possibility of the file system according to the invention). In addition, the filing in an external component is centralized, according to the invention, for the multiplicity of users.

In order to free the individual user from the necessity to transmit filed data on storage means corresponding in each case to the current state of the art, according to an advantageous development of the invention, a media transfer module is introduced which is coupled to the file store or its (possibly obsolete) storage media and is designed for data transfer from the latter onto physically different, preferably modern storage media.

Finally, the achievement of the abovementioned inventive task is served by an interface for the said wide-area file system which is notable for a two-port store disposed at the input or output of the interface for the temporary storage of data to be filed or to be retrieved and which can be connected by means of its one port either to the data source or to the bus of a local network associated, for instance, with the data source or to the file store, and by means of its other port to the wide-area network in each case.

Said interface may form an installed part of the wide-area file both on the user side and on the file side. The functional component "interface" first receives and (temporarily) stores the data to be filed from the data sources and decouples (on the file user side with respect to the wide-area network) the data sources from the filing operation which takes place via the wide-area network. In addition, the interface according to the invention can also be used to decouple (on the file side with respect to the wide-area network) the filing operation from the communication with the interface on the other file user side. After complete transfer of the data to be filed by at least two interfaces according to the invention (one on the file user side, the other on the file side) via the interposed wide-area network, filing can take place.

Further details, features and advantages on the basis of the invention emerge from the subclaims, the description below of a preferred embodiment of the invention and the drawings. As diagrammatic block circuit diagrams, in the latter

DETAILED DESCRIPTION

Figure 1:
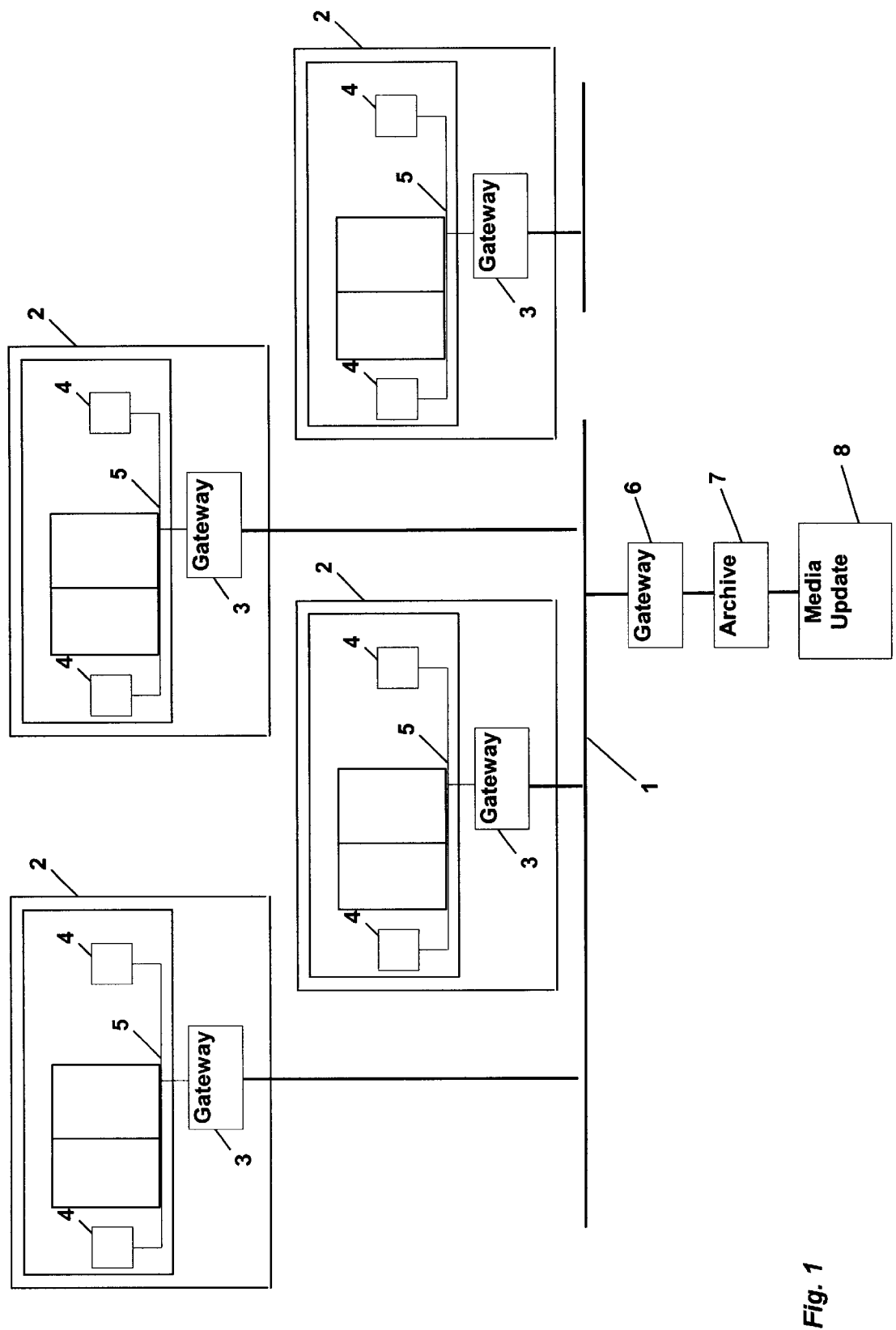
FIG. 1 shows the overall arrangement of the centralized wide-area file system for multiple users according to the invention.

According to FIG. 1, a multiplicity of local networks 2 is coupled in each case via a user gateway 3 to a public wide-area network ("data highway") 1. Within each local network 2, a plurality of user data sources 4 are linked via a respective local bus 5. A file store 7 is furthermore connected to the wide-area network 1 via a file gateway 6. The latter serves to store the data to be filed in addition to a corresponding database to be filed using suitable technology, a separation being carried out according to users, that is to say according to the various data sources 4. Linked to the file-storage system 7 is a media transfer module 8 which serves to update the media or storage technology used. After all, the media used for filing are subject to rapid technological progress and change. By means of the media transfer module 8, it is possible, when new media are marketed, to transfer all the filed data to new media of up-to-date technology. This ensures the availability of data and databases even in the long term.

Figure 2:
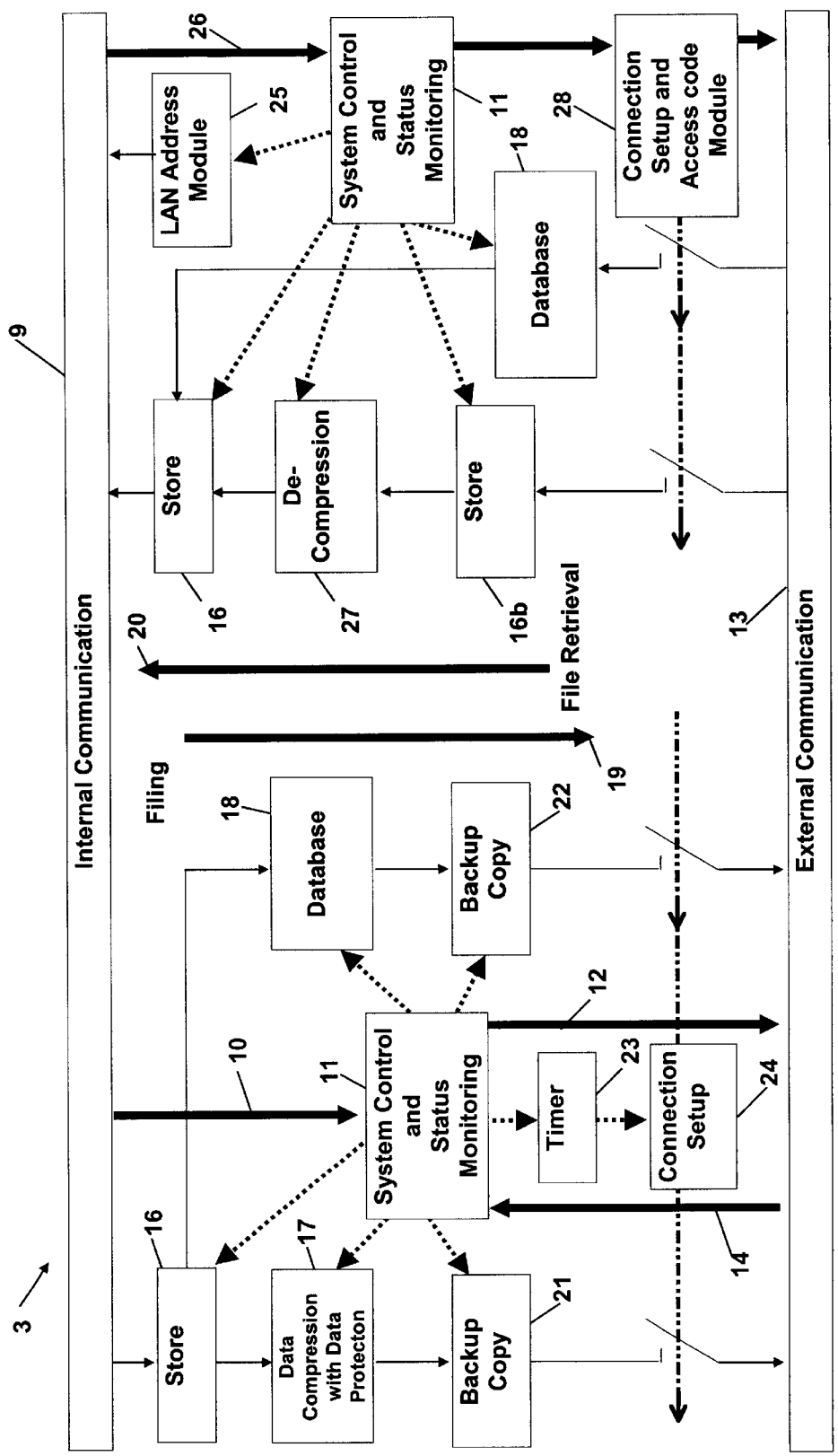
FIG. 2 shows components and data flow in a gateway according to the invention on the user side with a separate diagram for filing and retrieving.

FIG. 2 illustrates the internal structure of the user-side gateway 3 in greater detail. The linkage to the local bus 5 of the local network 2 ("LAN", cf. FIG. 1) takes place via a bus 9 for the internal communication of gateway 3. Via the latter, user filing requests 10 originating from the local network are transmitted to a monitoring and control unit 11. The latter can pass corresponding requests 12 to the file gateway 6 (cf. FIG. 3) to initiate the filing to a further bus 13 for external communication, which bus is coupled to the public wide-area network 1 (cf. FIG. 1). Conversely, the bus 13 for external communication can input acknowledgements 14 from the file-side gateway 6 relating to filing which has taken place into the monitoring and control unit 11. Said unit controls the entire filing operation on the user side and monitors the status (for example, "store full") of the storage components necessary to store data, the database and the respective backup copies to be stored.

A two-port store 16 directly connected to the bus 9 for internal communication passes data read in from bus 9 to its output port, both to a data-compression module 17 with integrated data encrypting for the purpose of data protection and to a database 18. The two-port store 16 is an essential component of the data transfer from the data sources 4 by means of standard network protocols (for example, TCP/IP, Novell, DICOM) by the user-side gateway 3. Only after complete reception (storage) of the data to be filed in the two-port store 16 is the filing operation started. This achieves the effect of decoupling the communication between the user gateway 3 and the file gateway 6. The same applies in the retrieval direction 20 which is opposite to the filing direction 19.

For the purpose of filing, the data are compressed in the data-compression module 17. Since they have left the sphere of influence of the user during the filing, encrypting with a user-defined password is necessary for data protection reasons. During each filing, the user-specific database 18 is expanded with all the items of information necessary for identification and retrieval. Both the data-compression module 17 and the database 18 are each linked to one of two backup copy modules 21, 22. The first-named module 21 serves for data protection by storing the compressed data record in a store which is physically independent of the two-port store 16 (redundancy). Consequently, at any time in the filing operation, the data are available twice in the centralized wide-area filing system. The second backup copy module 22 is activated after any change in the contents of the database 18 in order to regenerate a complete backup copy. In addition to the abovementioned functional components, the monitoring and control unit 11 also actuates a timer module 23 which controls the start of the data transfer to the centralized wide-area file as a function of a preselected time of day and the data volume to be filed depending on the filing operation. Consequently, the transmission can take place at the most favourable tariff times of the wide-area network provider (e.g. Telekom). The timer module 23 triggers a module 24 to set up a connection via the wide-area network 1 by means of the file gateway 6. As a result, the transfer is made possible to the file gateway 6 of the backup copies of the database 18 and of the compressed data, which returns to the two-port store 16.

In accordance with FIG. 2, during the retrieval process 20, an address store 25 is actuated by the control unit 11 if the control unit 11 receives a user retrieval request 26 from the bus 9 for internal communication. The file user thereby stipulates which of the data sources 4 in the local networks 2 (cf. FIG. 1) are to have the data to be retrieved at their disposal. During the retrieval 20, the data are then automatically transferred to the data sources specified by the address store 25. In any case, the data retrieved have to be decompressed for the purpose of use by the user, for which purpose a decompression module 27 is used. This is written on the input side of a further two-port store 16b which serves as intermediate buffer and whose input can be coupled directly to the bus 13 for external communication if triggered by a connection setup and access module 28. This is symbolized by diagrammatically indicated switching elements having broken-line control inputs (the same applies correspondingly for the connection setup module 24 in connection with the outputs of the backup copy modules 21, 22). The connection setup to the file gateway 6 for the retrieval 20 takes place after a corresponding request 26 by the user to the control unit 11 of the user gateway 3, which control unit 11 also triggers the connection setup module 28 and is dependent on the input of a correct access code relating to the retrieval request 26.

A comparison submodule integrated with the connection setup module 28 may serve for this purpose. If, for example, the connection from file gateway 6 to user gateway 3 is opened in the reverse direction for maintenance and diagnostic purposes, the access to data in the user gateway 3 can take place only after transmitting an access code stored in the user gateway 3 from the file gateway 6 to the user gateway 3. The comparison module 28 is also expediently designed for this purpose.

Figure 3:
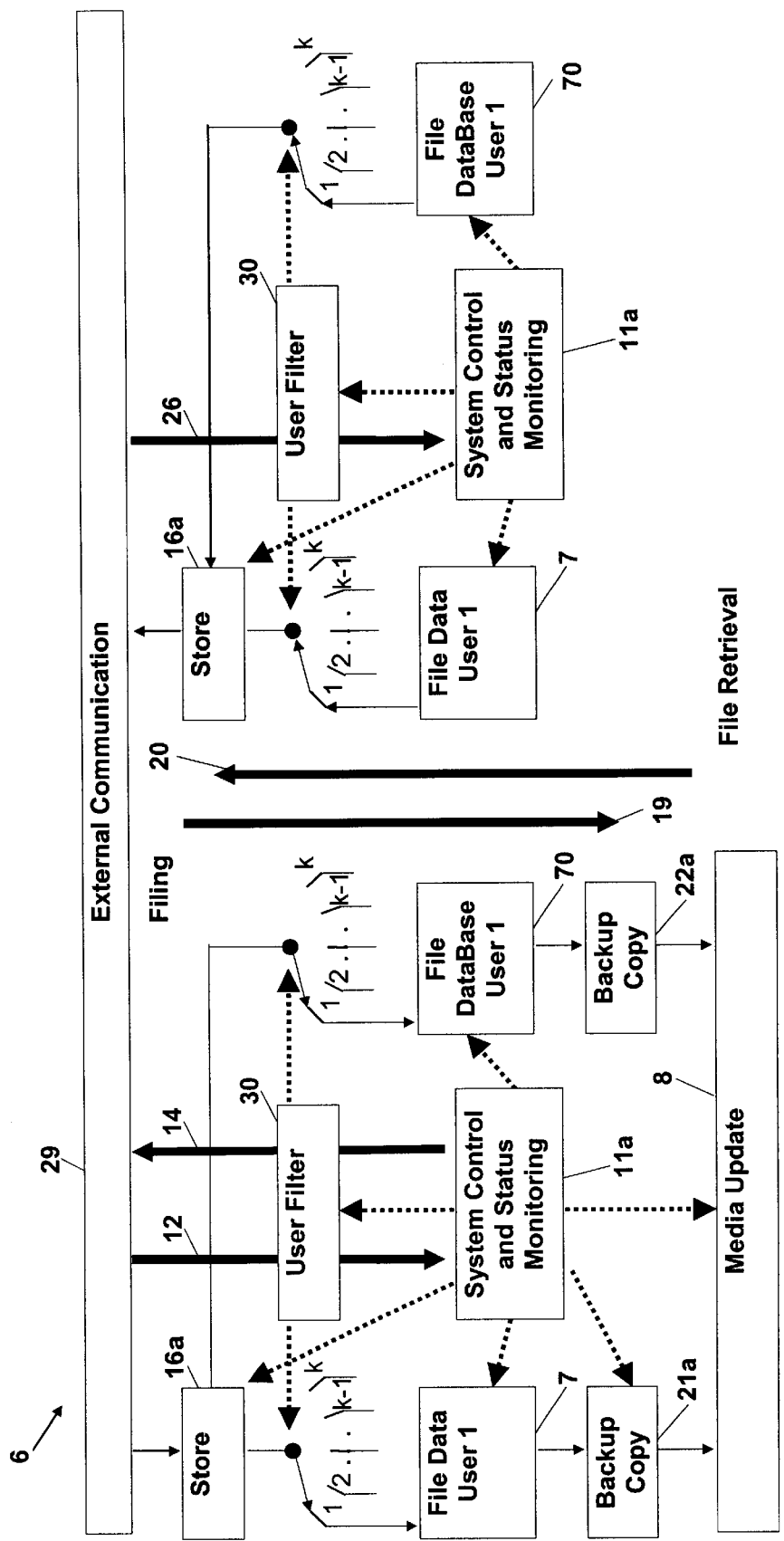
FIG. 3 shows components and data flow in a gateway according to the invention on the file side with file store and media updating, likewise with a separate diagram for filing and retrieving.

According to FIG. 3, the filing gateway 6 has an internal structure, likewise shown separately for filing 19 and retrieval 20, as follows: the direct coupling to the wide-area network 1 likewise takes place via an internal gateway bus 29 for external communication. As a result, the filing/retrieval requests 12, 26 or acknowledgement 14 originating from the user and/or the file-side control unit 11a and transmitted in each case via the wide-area network 1 is passed to the file side or to the user side. The file-side control unit 11a supervises a similar two-port store 16a which serves the data transfer with the user gateway 3. The filing operation is started only after complete reception (storage) of the data to be filed in the two-port store 16a, the file store 7 being written in accordance with the filing direction 19. A communication between the two gateways 3, 8 on the user and file sides is consequently decoupled from the filing. The same applies to retrieval in the reverse direction 20. The output port of the two-port store 16a is influenced by a user filter 30 which serves to address and to keep apart different storage fields in the file store 7 for users 1, 2, ..., k−1, k. This applies correspondingly to the file database 70 which contains the items of information from the backup copy 22 of the database 18 on the user side (cf. FIG. 2). Since the data/databases of various users 1, 2, ..., k−1, k are kept and managed on the file side, a clear separation must take place between the users. The user filter 30 ensures that every user can transfer in the file store 7 and in the file database 70 only in his area. The same applies in the reverse direction 20 for the retrieval.

For the purpose of data security, the filed data and also the contents of the file database 70 are each stored in a second, physically independent store (not shown) by means of a respective backup copy module 21a, 22a. Consequently, the filed data and also the database content are available at any time, even in the long term, in the centralized wide-area file. The monitoring and control unit 11a in the file gateway 6 controls the entire filing operation on the file side and monitors the status of the stores (for example, "store full") necessary for storing data, the database content and the respective backup copies to be filed.

What is claimed is:

1. A method for archiving and de-archiving data of a plurality of geographically mutually remote data sources, the method comprising;
    (a) coupling the data sources through a public, wide-area data transmission network to a central file-storage system external and geographically remote from the data sources;
    (b) buffering data transmitted over the network in interfaces connected between the network and each remote data source;
    (c) maintaining mutually separable storage fields in the central file-storage system by allocating separate storage fields to the data of every one of the remote data sources by a user filter coupled to the file-storage system to ensure that every user can transfer in the central file storage system only in his field; and
    (d) comparing an access authorization code transmitted from a remote data source to an access code stored at the central file-storage system and permitting access by a remote data source to the separate storage fields allocated to the data source in the central, file-storage system after comparison of the access authorization codes.

2. An apparatus for archiving and de-archiving data of a plurality of geographically mutually remote data sources, the apparatus comprising:
    (a) a central, file-storage system external and geographically remote from the data sources;
    (b) a public, wide-area data transmission network coupling the central, file storage system to the data sources;
    (b) interfaces interposed between the network and each remote data source for buffering data transmitted over the network and coupling remote data sources to the file storage system after comparison of access authorization codes; and
    (c) a user filter coupled to the storage system and allocating mutually separable storage fields in the central file-storage system, separate fields being allocated to the data of every one of the remote data sources to ensure that each remote data source can transfer with the central file storage system only in the field allocated to it.

3. An apparatus according to claim 2 wherein the interfaces are bridges or gateways for linking the data sources and the file-storage system to the wide-area network.

4. An apparatus according to claim 2 or 3, wherein a media transfer module is coupled to the file-storage system for data transfer between physically different storage media.

5. An apparatus according claim 2 and further including a field for storing data for identifying and retrieving the data associated with a data source is provided in the file-storage system.

6. An apparatus in accordance with claim 2 wherein the interfaces include a two-port store for temporarily storing data, the two-port store capable of being coupled by one port to the data source and by its second port to the wide-area network, the two port store being linked with a connection setup module for setting up a connection of the two-port store via the wide-area network to a file storage interface at the file-storage system in order to enable or disable said connection setup module, the connection setup module linked with a comparison submodule for comparing the access authorization codes.

7. An apparatus according to claim 6 wherein the file storage interface includes a two-port store having a first port, which can be connected to the file-storage system, for routing by the user filter to predetermined address fields.

8. An apparatus according to claim 6, at least one of the interfaces includes a data-compression module and a data-decompression module linked to the two-port store.

9. An apparatus according to claim 6 and further comprising a database module coupled to the two-port store, for storing data for the identification and retrieval of data-source-specific data.

10. An apparatus in accordance with claim 6 and further comprising a backup copy module linked to the two-port store.

11. An apparatus in accordance with claim 6 and further comprising a time-control module for the predetermined triggering of a module for setting up a connection of the two-port store via the wide-area network with the file-storage system.

12. An apparatus in accordance with claim 6 and further comprising an address store for an adjacent local network for specifying the target addresses on a bus of the local network for data to be retrieved from the two-port store connected to the local network bus.

* * * * *

US006321254C1

(12) EX PARTE REEXAMINATION CERTIFICATE (5225th)
United States Patent
Meyer et al.

(10) Number: US 6,321,254 C1
(45) Certificate Issued: Nov. 1, 2005

(54) METHOD AND INTERFACE FOR A CENTRALIZED ARCHIVING AND DE-ARCHIVING SYSTEM

(75) Inventors: Ernst Woldemar Wolfgang Meyer, Cologne (DE); Uwe Hans Mundry, Greenville, SC (US)

(73) Assignee: 2M Asset Management, LLC, Greenville, SC (US)

Reexamination Request:
No. 90/007,141, Jul. 29, 2004

Reexamination Certificate for:
Patent No.: 6,321,254
Issued: Nov. 20, 2001
Appl. No.: 09/202,861
Filed: Mar. 15, 1999

(22) PCT Filed: May 15, 1997
(86) PCT No.: PCT/EP97/02492
§ 371 (c)(1),
(2), (4) Date: Mar. 15, 1999
(87) PCT Pub. No.: WO97/50048
PCT Pub. Date: Dec. 31, 1997

(30) Foreign Application Priority Data
Jun. 24, 1996 (DE) ......................................... 196 25 196

(51) Int. Cl.$^7$ ............................................. G06F 13/00
(52) U.S. Cl. ..................... 709/213; 709/215; 709/217; 709/225
(58) Field of Search ................................ 709/200–203, 709/213–225

(56) References Cited

U.S. PATENT DOCUMENTS 5,732,214 A   3/1998   Subrahmanyam
5,771,354 A   6/1998   Crawford

OTHER PUBLICATIONS

"Welcome To Asynchronous Transfer Mode (ATM) Module", Internet Document: http://cne.gmu.edu/modules/atm/abbr.html, Copyright 1995, 25 pages.

*Primary Examiner*—Moustafa M. Meky

(57) ABSTRACT

An arrangement for filing and retrieving data of a plurality of mutually remote data sources which are connected to a remote central file-storage system by a public, wide-area transmission network. Mutually separable storage fields are maintained in the central file-storage system by allocating separate storage fields to the data of each of the remote data sources by a user filter coupled to the file storage system to ensure that every user can transfer in the central file system only in his field. An access authorization code transmitted from a remote data source is compared to an access code stored in the file-storage system to permit access by a remote data source to the separate storage fields allocated to the data source seeking access.

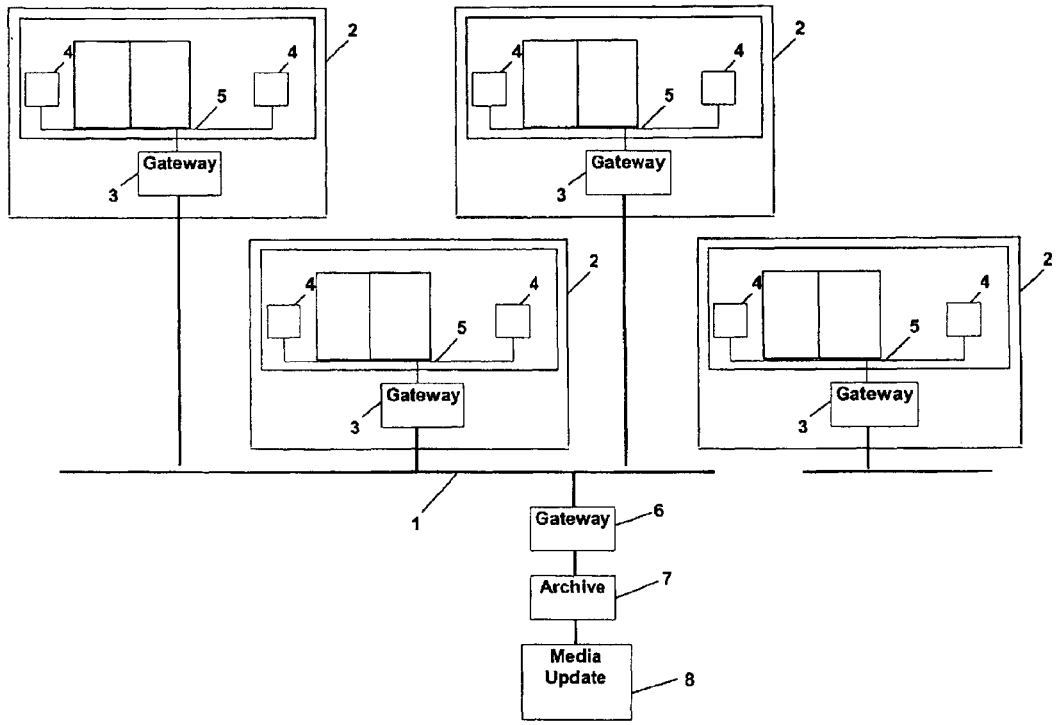

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–12 is confirmed.

\* \* \* \* \*